(12) United States Patent
Hennemann et al.

(10) Patent No.: US 6,786,489 B1
(45) Date of Patent: Sep. 7, 2004

(54) SEALING INSERT, ESPECIALLY FOR A PISTON IN THE HYDRAULIC BRAKING SYSTEM OF A MOTOR VEHICLE

(75) Inventors: Karl-Heinz Hennemann, Bad Homburg (DE); Harald König, Ober-Mörlen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/786,082

(22) PCT Filed: Jul. 16, 1999

(86) PCT No.: PCT/EP99/05097

§ 371 (c)(1),
(2), (4) Date: Apr. 25, 2001

(87) PCT Pub. No.: WO00/12367

PCT Pub. Date: Mar. 9, 2000

(30) Foreign Application Priority Data

Aug. 31, 1998 (DE) .......... 198 39 597

(51) Int. Cl.[7] ............................ F16J 9/00
(52) U.S. Cl. ............... 277/437; 277/438; 277/439
(58) Field of Search .................. 277/437, 438, 277/439; 264/273, 274, 274.1

(56) References Cited

U.S. PATENT DOCUMENTS

| | | | | |
|---|---|---|---|---|
| 2,287,483 A | * | 6/1942 | Miller | 277/437 |
| 2,512,098 A | * | 6/1950 | Gratzmuller | 277/437 |
| 2,600,516 A | * | 6/1952 | Pielop, Jr. | 277/437 |
| 2,637,606 A | * | 5/1953 | Pielop, Jr. | 277/438 |
| 2,679,441 A | * | 5/1954 | Stillwagon | 277/437 |
| 2,743,972 A | * | 5/1956 | MacClatchie | 277/437 |
| 2,793,921 A | * | 5/1957 | Phipps | 277/437 |
| 3,666,322 A | * | 5/1972 | Pickron | 301/64.701 |
| 3,843,202 A | * | 10/1974 | Lacerte | 301/64.701 |
| 4,535,827 A | * | 8/1985 | Seaford | 152/323 |
| 4,827,834 A | * | 5/1989 | Leigh-Monstevens | 192/85 CA |
| 5,183,271 A | | 2/1993 | Wada et al. | |
| 5,334,039 A | * | 8/1994 | Kanda | 264/135 |
| 5,480,163 A | * | 1/1996 | Miser et al. | 277/437 |
| 6,196,552 B1 | * | 3/2001 | Peterson et al. | 277/437 |
| 6,203,022 B1 | * | 3/2001 | Struschka et al. | 277/437 |

FOREIGN PATENT DOCUMENTS

| | | |
|---|---|---|
| DE | 44 25 403 | 1/1996 |
| DE | 196 10 834 | 6/1997 |
| DE | 196 15 157 | 10/1997 |
| EP | 0 519 533 | 12/1992 |
| EP | 0 565 015 | 10/1993 |
| GB | 5 41 016 | 11/1941 |
| GB | 2 256 687 | 12/1992 |

OTHER PUBLICATIONS

Search Report of the German Patent Office for Application No. 198 39 597.3.

* cited by examiner

Primary Examiner—Heather Shackelford
Assistant Examiner—Michael J. Kyle
(74) Attorney, Agent, or Firm—Honigman, Miller Schwartz and Cohn LLp

(57) ABSTRACT

The present invention discloses a sealing insert, in particular for a piston in a hydraulic brake system, comprising a central valve arranged in a cavity, a supporting body and a rubber-elastic sealing body that is adhesively connected to said supporting body. The supporting body exhibits through holes which are penetrated by the sealing body for fixing purposes.

12 Claims, 4 Drawing Sheets

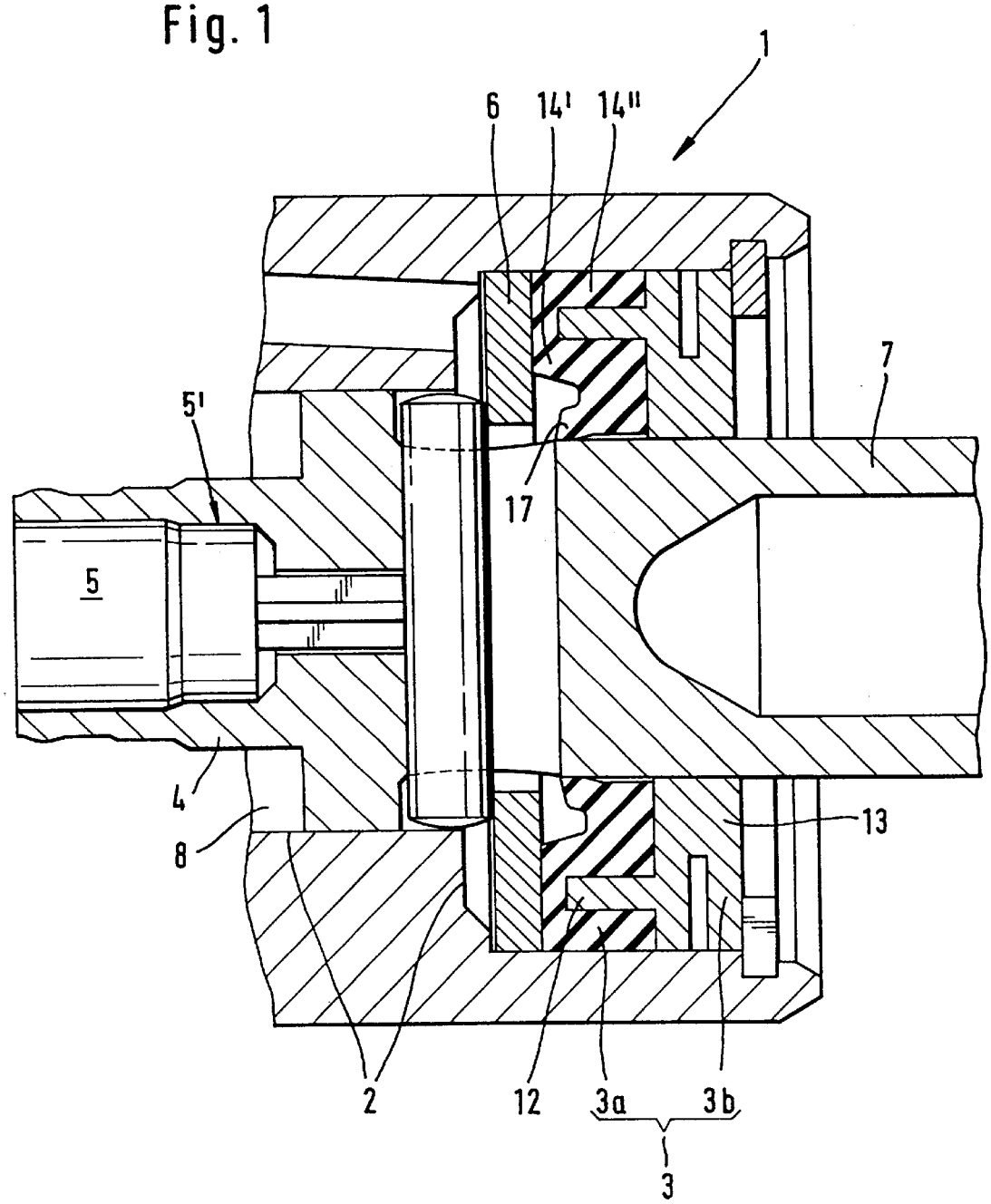

SEALING INSERT, ESPECIALLY FOR A PISTON IN THE HYDRAULIC BRAKING SYSTEM OF A MOTOR VEHICLE

TECHNICAL FIELD

The present invention generally relates to piston seals and more particularly relates to a sealing insert.

BACKGROUND OF THE INVENTION

In motor vehicles which, for example, are equipped with an antiblock system (ABS) or traction control system (TCS), a so-called tandem master cylinder with a central valve usually is an essential part of the hydraulic brake system. When such a tandem master cylinder with a central valve is used, an associated sealing (primary sealing member) is not damaged when brake pressure is built up suddenly due to ABS or TCS operations; contrary to master cylinders with radially oriented supply bores, so-called breathering holes.

In general the central valve in the cavity of the associated piston assumes the same function as the supply bore together with the primary sealing member, i.e. it ensures the required equalization of quantity and pressure of hydraulic brake fluid between the master cylinder and the brake lines connected thereto within a dual-circuit brake system. In other words the equalizing port is not needed, since its function is assumed by the central valve. The sealing insert disclosed hereunder regularly seals off one end of the housing of the tandem master cylinder, holding and sealing the piston, which can be activated in this way, in an axially displaceable manner in an associated hole enclosed by the master cylinder.

Such sealing inserts usually comprise a supporting body and rubber-elastic sealing body that is adhesively connected to the supporting body. For this purpose, said sealing body can be sprayed or vulcanized on the supporting body (please refer to DE-OS 39 32 248).

A similar process is used for a sealing insert of the kind described above, where the sealing body is vulcanized or cast on the supporting body. In addition, a ring-shaped collar is definitely necessary (see DE-OS 42 15 079) for the supporting body in this disclosure so as to improve the absorption of axial forces between the associated sealing body and supporting body.

Finally, in another embodiment the sealing body and supporting body are connected to one another in a separable way, and a ring-shaped circumferential projecting part that forms one piece with the supporting body is provided, with such projecting part axially extending through the sealing body completely or nearly completely. In this way, it is ensured that the central valve opens at defined intervals (see DE-PS 196 10 834).

The above-mentioned state-of-the-art is not completely free of deficiencies. Thus, perfect operation of the central valve is achieved by connecting the sealing body and supporting body separably; as a consequence, there are disadvantages as far as storage and assembly are concerned. Usually one strives for a minimum number of parts for series production in automobile manufacturing (see DE-PS 196 10 834). When studying the other embodiments, it needs to be pointed out that a form-fit and perfect connection between the sealing body and supporting body is not always ensured for the entire life despite such additionally realized measures as the ring-shaped collar. It is here that the present invention proposes a solution.

The present invention is based on the technical problem of designing further a sealing insert of the kind described above, so that, firstly, the sealing function is perfect when the central valve operates with defined valve timing and, secondly, the component can be produced simply and cost-efficiently, using as few parts as possible, and with a long service life.

The solution proposed by this invention is that the supporting body of a generic sealing insert exhibit through holes which are penetrated by the sealing body for fixing purposes. Contrary to the usual ring-shaped supporting body, these through holes are generally arranged radially.

In other words, the supporting body basically is designed as a ring with radial through holes, i.e. the through holes completely extend through the supporting body when viewing the cross-section. Naturally, other embodiments of the supporting body (i.e. no ring shapes) are conceivable within the scope of the present invention, even if this is not customary because the associated piston as well as the housing of the master cylinder generally are cylindrical.

In order to ensure that the through holes can be produced in a particularly simple way, through holes arranged opposite one another have parallel areas of contact. In this way, the through holes can be inserted in the supporting body practically at the same time.

In its cross-section the supporting body generally is formed like an upside-down T with a T-bridge and T-legs; and the T-bridge usually faces the central valve, whereas the T-leg faces away from the central valve. The through holes can penetrate the T-bridge, so that the supporting body can be fixed onto the T-leg while they are being produced. In so far as the through holes are not produced subsequently and the supporting body is a (plastic) injection-molded part, it should be pointed out that in this embodiment of the invention only the (more narrow) T-bridge exhibits the through holes; hence, the overall stability of the supporting body is not affected. This is of special importance since temperature-resistant duroplastics usually are used for producing the supporting body.

As a rule, the sealing body's cross-section is formed like an upside-down U with U-legs arranged on both sides of the T-bridge and a U-base on the face of the T-bridge; i.e. the sealing body envelopes, as it were, the T-bridge and its ends rest on each of the U-legs of the U-leg. This already ensures a large fixing area between sealing body and supporting body in the course of injection molding with a rubber-elastic sealing substance (e.g. EPDM). Naturally, customary processes, if necessary by adding bonding agents, can be applied.

The thickness of the U-base of the sealing body should correspond to one-half to one-fifth, preferably about one-third, of the thickness of the U-legs, so that the T-bridge almost completely penetrates the sealing body at this point (i.e. in the area of the U-base of the sealing body), allowing only limited elastic deformation of the U-base. In other words, according to a preferred embodiment, the U-base covers the T-bridge of the supporting body like a thin skin, so to speak. As a result the same effect as that according to DE-PS 196 10 834 is achieved, namely that the central valve or an associated stop ring can abut against the sealing insert softly and slightly dampened. At the same time, the rubber-elastic U-base is deformed only slightly due to its negligible thickness, so that defined opening of the central valve is ensured irrespective of the pressure, against which the central valve has to be opened.

In this way, a rigid or quasi-rigid end stop is provided for the central valve, without having to prejudice the achievable tightness. Such defined opening of the central valve or reliable and constant timing of the central valve is of special importance in the present invention because particularly in brake systems with a brake-pressure control system, as for example ABS or TCS, the central valve may have to be opened against considerable overpressure, especially if, for example, an ABS braking operation is necessary directly after a traction-slip control cycle. As a matter of fact, in such a case the brake-fluid pressure built up in the pressure chamber of the master cylinder or tandem master cylinder within the scope of the traction-slip control cannot be relieved prior to the braking operation following directly afterwards, because the fluid volume or brake-fluid volume supplied during the above-mentioned control cycle cannot be returned to an associated fluid tank. Depending on how high the predominant fluid pressure still is, the opening time of the central valve varies since it (via the end stop penetrates deeper into the sealing body of the sealing insert the higher the predominating pressure is. Consequently, a clear definition of the opening time or timing of the central valve is required to ensure constant brake response behavior. This is achieved within the scope of the present invention by the U-base of the sealing body, which is designed, as it were, as a thin skin as well as the T-bridge extending below the U-base, which serves as an end stop for the central valve or associated stop ring.

According to another preferred embodiment of the present invention, cross holes that communicate with the through holes are provided. In this connection, at least one cross hole is connected to a through hole, whereby the cross holes can be concentrically distributed in the T-leg. For the purpose of injection, the liquid rubber-elastic material (e.g. EPDM) can be filled into the supporting body under pressure at the same time via the cross holes and is distributed as desired via the through holes by forming the U-shaped sealing body in the cross-section, whose outside contours are defined by a corresponding (injection-molding) form. In order to ensure as great an overall rigidity (against deformation) of the sealing insert as possible, the through holes and cross holes are arranged at axially offset positions in the supporting body, i.e. they do not overlap in the direction of the (rotationally symmetrical) axis of the sealing insert.

Finally, the U-leg of the sealing body facing a (insert) hole may exhibit a V-shaped hole seal lip formed on said leg, which is supported on the T-side. Also the side of the sealing body facing away from the (insert) hole preferably exhibits a V-shaped piston seal lip formed on it, which is also supported on the T-leg.

As a result the scope of the present invention at first achieves reliable tightness by means of the injection-molded sealing insert and sealing body. The timing of the central valve practically is not affected, irrespective of the predominating fluid pressure, against which it has to be opened; hence, constant brake response behavior can be expected. At the same time, simple and low-cost manufacturing is possible, because time-proven and cost-efficient production processes as well as low-cost materials can be used. Furthermore, assembly is simplified because only one compact component is provided, which, in addition, can be mounted automatically. Moreover, a particularly firm formfit connection between the two parts is attained by fixing the sealing body in the supporting body by means of the through holes. This has a positive effect on the service life of the valve sealing insert. These are the essential advantages of the present invention.

BRIEF DESCRIPTION OF THE DRAWING

FIG. 1 shows a cross-section of a tandem master cylinder.

DETAILED DESCRIPTION OF THE PREFERRED EMBODIMENTS

Figure 3:
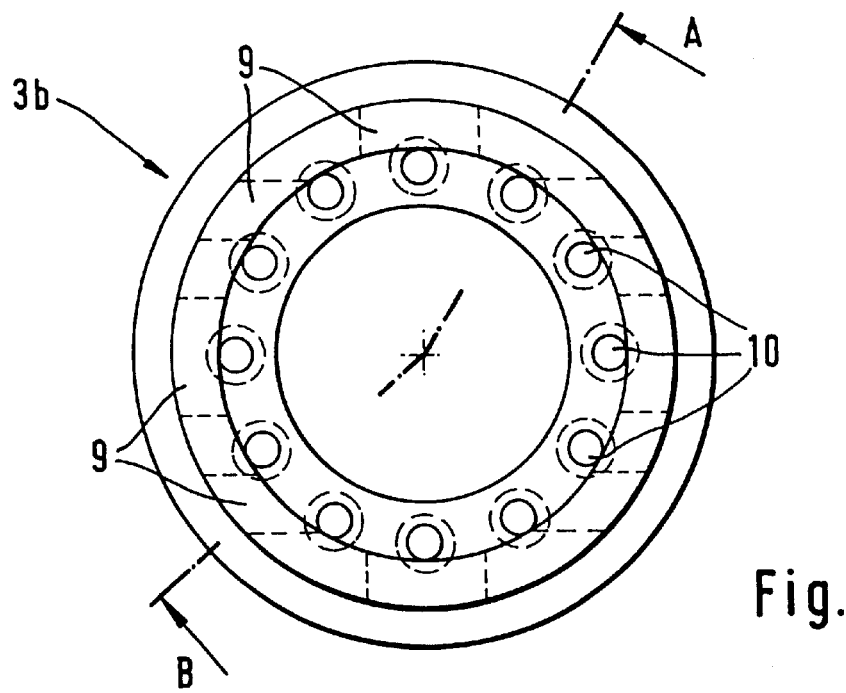
FIG. 3 is a top view of the object according to FIG. 2.

A tandem master cylinder 1, such as the one described in German patent 196 10 834, is outlined in the figures. This tandem master cylinder 1 is part of a hydraulic brake system of a motor vehicle, which is applied in a vehicle equipped with a brake-pressure control system (ABS and/or TCS). Said master cylinder 1 exhibits a stepped hole 2. The end of this hole 2, which is not shown here, usually is hermetically sealed by a face of the housing of the master cylinder 1. The other end of the hole 2, i.e. the end lying opposite the above-mentioned end, exhibits the sealing insert 3, which will be described in more detail later. It should be underscored that FIG. 1 provides only a rough representation of the sealing insert 3; for more details, please refer to the following figures. Due to this fact there may be deviations in the design; however, only FIGS. 2 to 5 shall be decisive.

A piston 4, which can be actuated by sealing insert 3, is held in hole 2 in the immediate vicinity of sealing insert 3 in such a manner that it is sealed and axially displaceable. A central valve 5 is arranged in piston 4 in a cavity 5'. When piston 4 is in its rest position, said central valve 5 abuts against stop ring 6, which in turn abuts against a sealing body 3a of sealing insert 3. In this way, central valve 5 is held in an open position.

When the brake system is activated, piston 4, as shown in FIG. 1, is displaced to the left via an activation extension 7, so that central valve 5 moves away from stop ring 6 and is closed. Hence, fluid pressure can be built up in a pressure chamber 8 after piston 4 is appropriately displaced axially. While master cylinder 1 is being activated in said manner, sealing insert 3 according to the present invention seals hole 2 against activation extension 7 and guides it.

The relief movement is executed in the reverse order, i.e. piston 4 is displaced to the right, related to FIG. 1, by a readjusting spring (not shown). Accordingly, central valve 5 contacts stop ring 6 shortly before piston 4 reaches its rest position, allowing central valve 5 to open again. Consequently, any residual pressure in pressure chamber 8 is let off into a fluid tank (not shown) via supply bores (also not shown). In the event that a brake control cycle occurred shortly before the brake was activated and pressure chamber 8 exhibits additional fluid volume, central valve 5 may have to be opened against considerable overpressure at the end of such a braking operation. In this case, the opening time of central valve 5 practically does not change, because the pressure transmitted from pressure chamber 8 via stop ring 6 onto sealing insert 3 and/or its sealing body 3a causes sealing body 3a to be compressed quickly, so that stop ring 6 contacts sealing insert 3 practically without any delay and without any significant deformation of sealing body 3a. How this is achieved, is explained below with reference to FIGS. 2–5.

In its basic design, sealing insert 3 consists of a supporting body 3b and the already mentioned rubber-elastic sealing body 3a that is adhesively connected to supporting body 3b. Supporting body 3b can be disposed as an injection-molded plastic or metal part, whereas sealing body 3a is formed on supporting body 3b by means of injection molding in the course of customary manufacturing. Supporting body 3b exhibits through holes 9, which are penetrated by sealing body 3a for fixing purposes. The through holes 9 are arranged approximately in the middle of supporting body 3b in the axial direction. This gives rise to the advantage that the contraction characteristics of the material used for the sealing body when the sealing material cools down after the injection-molding operation (under high pressure and temperature) will not affect the roundness of the seal lip. In other words, the described arrangement results in perfect roundness. The complete, firm molding is obtained in the course of manufacturing in that cross holes 10 which communicate with through holes 9 are provided. For this purpose, at least one cross hole 10 is connected to an associated through hole 9.

In particular in FIG. 3, one can see that cross holes 10 are distributed concentrically related to supporting body 3b. In the present case, there are 12 cross holes disposed at a distance of 30/. In FIGS. 2 to 5, through holes 9 and cross holes 10 are arranged in axially displaced positions in relation to the supporting body 3b, so that any deformation/twisting of supporting body 3b is precluded.

Figure 2:
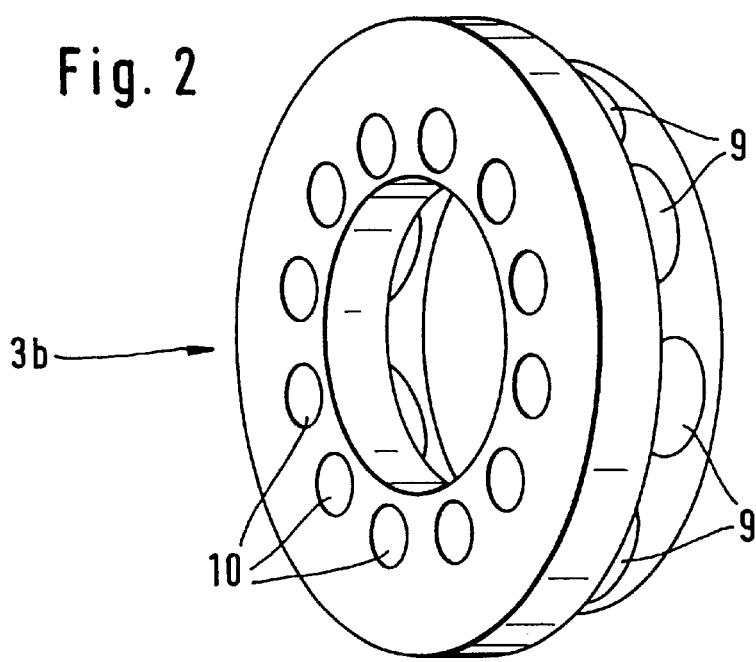
FIG. 2 is a perspective view of the supporting body without the sealing body that is formed on it.
Figure 4:
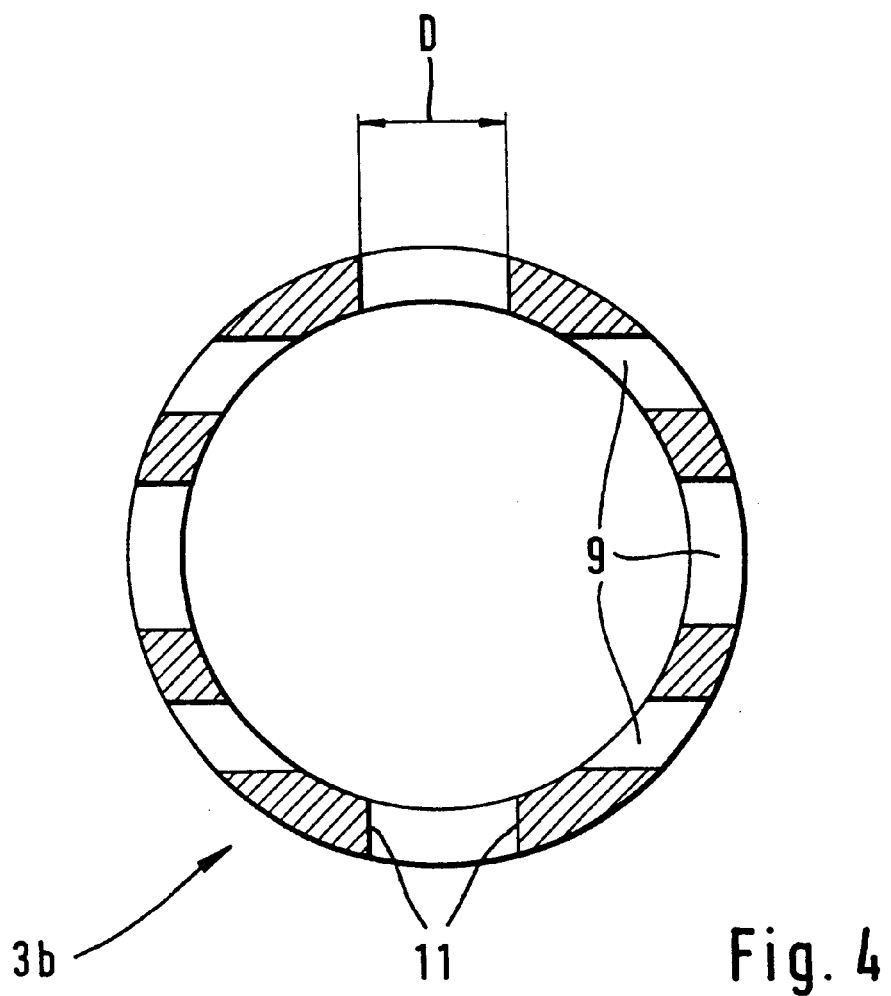
FIG. 4 shows a longitudinal section of FIG. 2 in the area of the T-bridge.
Figure 5:
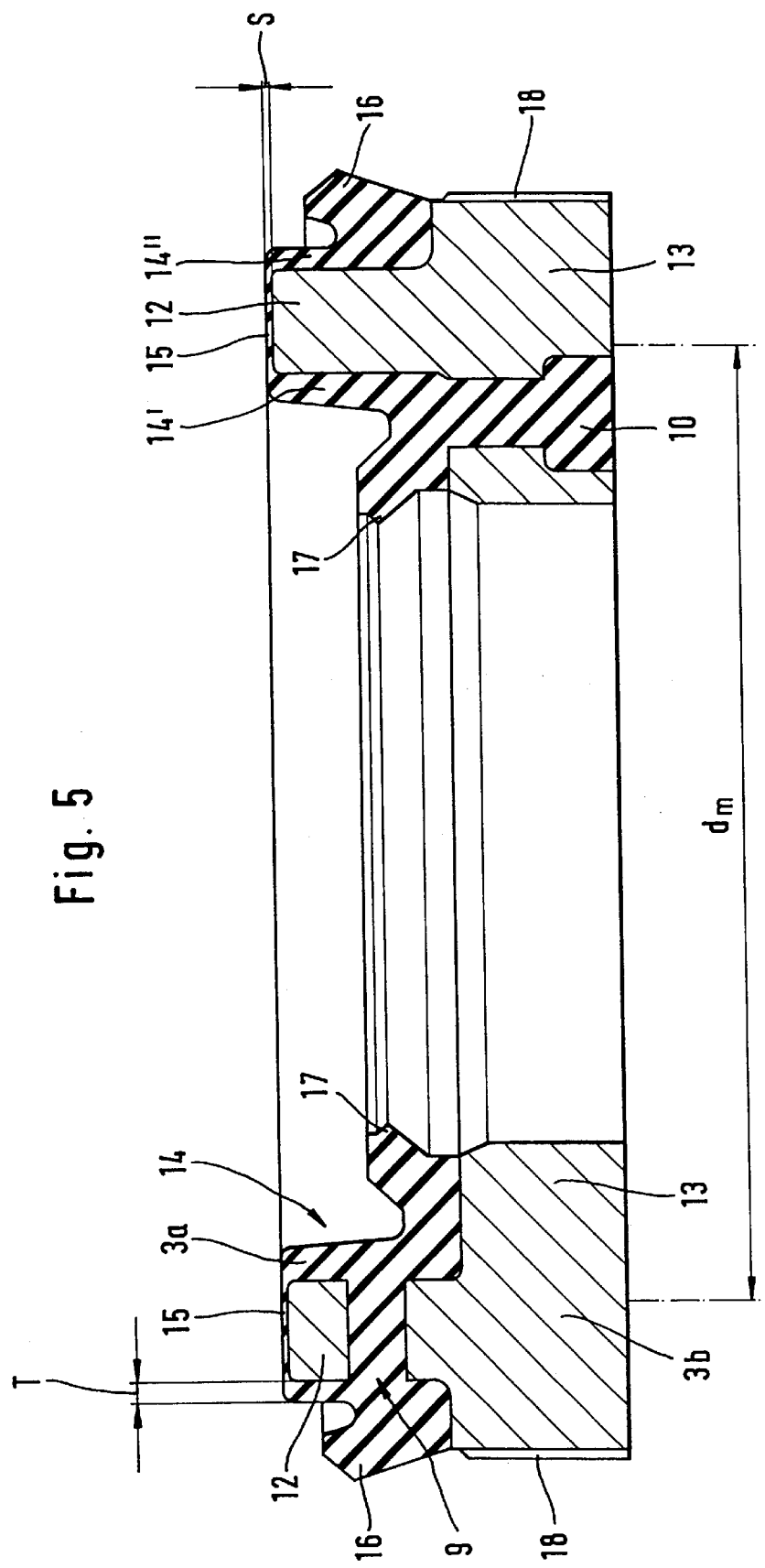
FIG. 5 shows a cross-section of FIG. 2 with the sealing body formed on, namely along line A–B in FIG. 3.

In addition, FIGS. 2 to 4 show that through holes 9 are arranged radially in relation to the (circular) ring-shaped supporting body 3b; and opposite through holes 9 exhibit parallel areas of contact 11, which has proven particularly advantageous for low-cost manufacturing. Areas of contact 11 include a (open circular, ring-shaped) segment of supporting body 3b having prescribed thickness D. On the basis of FIG. 5, it becomes evident that in its cross-section supporting body 3b is formed like an upside-down T with T-bridge 12 and T-leg 13. Whereas T-bridge 12 faces central valve 5, T-leg 13 faces away from central valve 5. Based on the above-mentioned representation, it is evident that through holes 9 penetrate T-bridge 12 and cross holes 10 are distributed concentrically in the T-leg. As a rule, cross holes (10) are arranged at right angles to through holes (9).

In its cross-section, sealing body 3a is formed like an upside-down U with U-legs 14 arranged on both sides of T-bridge 12 and U-base 15 located at the face end of T-bridge 12, wherein U-base 15 of sealing body 3a has a thickness S, which, according to the embodiment, corresponds to about one-third of the thickness of U-leg 14. Hence T-bridge 12 almost completely penetrates sealing body 3a at this point, i.e. in the area of U-base 15. Consequently, T-bridge 12 permits only limited elastic deformation of U-base 15 here. U-base 15, as it were, forms only a thin skin over said T-bridge 12, so that the timing of central valve 5 is basically not affected, irrespective of the pressure fluctuations of the fluid in pressure chamber 8. This already has been explained. Finally, U-leg 14 of sealing body 3a facing hole 2 exhibits a V-shaped seal lip 16 formed on it, which is supported on T-leg 13 and ensures static sealing, i.e. sealing without sliding motion, at the wall of the hole. U-leg 14" of sealing body 3a facing away from hole 2 also exhibits a V-shaped seal lip formed on it, which is subject to dynamic loads due to the movable piston and is shown as a formed-on piston seal lip 17 here. This piston seal lip 17 also is supported on T-leg 13. Piston seal lip 17, so to speak, also acts as a supporting inner sealing member for activation extension 7. In order to obtain firm support for the seal lips and to promote both the dynamic and static sealing performance, the T-bridge basically is disposed radially outside a middle diameter $d_m$ of sealing body 3a. Thus, a rigid support of the statically loaded seal lip 16 and an elastic flexible support of dynamically loaded seal lip 17 are obtained.

Finally, supporting body 3b has receiving bridges 18 formed on it below hole seal lip 16, and said receiving bridges 18 are distributed radially on its circumference on T-bridge 13. These receiving bridges 18 simplify automatic assembly; for example, they can be easily grasped by a gripper, so that sealing insert 3 can be positioned perfectly in the associated housing of tandem master cylinder 1 or its hole 2.

What is claimed is:

1. A tandem master cylinder, comprising:

a piston; and a piston sealing insert disposed within an aperture of said master tandem cylinder for sealing said piston, said piston sealing insert comprising a supporting body and a rubber-elastic sealing body that is adhesively connected to said supporting body, wherein the supporting body includes a central aperture and through holes which are penetrated by the sealing body for fixing the sealing body to the supporting body, wherein said supporting body further includes cross holes disposed at a distance from said central aperture which communicate with the through holes, wherein at least one cross hole is connected to a through hole.

2. Tandem master cylinder according to claim 1, wherein the through holes are disposed radially in relation to the supporting body.

3. Tandem master cylinder according to claim 1, wherein the through holes lying opposite one another exhibit parallel areas of contact.

4. Tandem master cylinder according to claim 1, wherein the supporting body, when viewed in its cross-section, is formed in the shape of an upside-down T with a T-bridge and T-leg, wherein the T-bridge faces oppositely from the T-leg.

5. Tandem master cylinder according to claim 4, wherein the through holes penetrate the T-bridge.

6. Tandem master cylinder according to claim 4, wherein the sealing body, when viewed in its cross-section, is formed in the shape of an upside-dawn U with U-legs arranged on both sides of the T-bridge and a U-base located at the face of the T-bridge.

7. Tandem master cylinder according to claim 6, wherein the thickness of the U-base of the sealing body corresponds to the range of one-half to one-fifth, of the thickness of the U-legs, so that the T-bridge almost completely penetrates the sealing body permitting only limited elastic deformation of the U-base.

8. Tandem master cylinder according to claim 4, wherein the cross holes are distributed concentrically in the T-leg.

9. Tandem master cylinder according to claim 1, wherein the through holes and cross holes are arranged in axially offset positions in the supporting body.

10. Tandem master cylinder according to claim 1, wherein the cross holes are arranged at right angles to the through holes.

11. Tandem master cylinder according to claim 6, wherein the U-leg of the sealing body which faces a hole includes a V-shaped hole seal lip that is formed on it, with said seal lip being supported on the T-leg.

12. Tandem master cylinder according to claim 6, wherein the U-leg of the sealing body which faces away from the central aperture exhibits a V-shaped piston seal lip that is formed on it, with said seal lip being supported on the T-leg.

* * * * *

UNITED STATES PATENT AND TRADEMARK OFFICE
CERTIFICATE OF CORRECTION

PATENT NO.      : 6,786,489 B1
DATED           : September 7, 2004
INVENTOR(S)     : Hennemann et al.

It is certified that error appears in the above-identified patent and that said Letters Patent is hereby corrected as shown below:

Column 6,
Line 41, please change "of an upside-dawn" to -- of an upside-down --.

Signed and Sealed this

Twenty-second Day of March, 2005

JON W. DUDAS
*Director of the United States Patent and Trademark Office*